(12) United States Patent
Piszczek et al.

(10) Patent No.: US 9,092,152 B1
(45) Date of Patent: Jul. 28, 2015

(54) DATA STORAGE SYSTEM EMPLOYING A DISTRIBUTED COMPUTE ENGINE MEMORY CONTROLLER WITH EMBEDDED LOGIC AND ARITHMETIC FUNCTIONALITY AND METHOD FOR DATA MIGRATION BETWEEN HIGH-PERFORMANCE COMPUTING ARCHITECTURES AND DATA STORAGE DEVICES USING THE SAME

(71) Applicant: DATADIRECT NETWORKS, INC., Chatsworth, CA (US)

(72) Inventors: Michael J. Piszczek, Laurel, MD (US); Thomas E. Fugini, Mt. Airy, MD (US); William J. Harker, Columbia, MD (US); Pavan K. Uppu, Laurel, MD (US); Jason M. Cope, Columbia, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 116 days.

(21) Appl. No.: 13/894,769

(22) Filed: May 15, 2013

Related U.S. Application Data

(60) Provisional application No. 61/782,612, filed on Mar. 14, 2013.

(51) Int. Cl.
*G11C 29/00* (2006.01)
*G06F 3/06* (2006.01)
*G06F 11/10* (2006.01)
*G06F 13/40* (2006.01)

(52) U.S. Cl.
CPC .............. *G06F 3/0647* (2013.01); *G06F 11/10* (2013.01); *G06F 13/4022* (2013.01)

(58) Field of Classification Search
CPC .. G11C 7/1006; G11C 16/06; G06F 11/1092; G06F 11/1008; G06F 11/1076; G06F 2211/1054; G06F 12/0246; G06F 3/067; G06F 3/0659
See application file for complete search history.

(56) References Cited

U.S. PATENT DOCUMENTS

| | | | | |
|---|---|---|---|---|
| 6,804,794 | B1 * | 10/2004 | Robidoux et al. | 714/5.11 |
| 2005/0027891 | A1 * | 2/2005 | Emmot et al. | 709/253 |
| 2005/0028069 | A1 * | 2/2005 | Thayer et al. | 714/770 |
| 2005/0080958 | A1 * | 4/2005 | Handgen et al. | 710/100 |
| 2005/0097184 | A1 * | 5/2005 | Brown et al. | 709/213 |
| 2006/0236032 | A1 * | 10/2006 | Campbell et al. | 711/118 |
| 2010/0037014 | A1 * | 2/2010 | Lim et al. | 711/105 |
| 2012/0117317 | A1 * | 5/2012 | Sheffler et al. | 711/103 |
| 2012/0131288 | A1 * | 5/2012 | Box et al. | 711/154 |

* cited by examiner

*Primary Examiner* — Guerrier Merant
(74) *Attorney, Agent, or Firm* — Rosenberg, Klein & Lee

(57) ABSTRACT

Distributed Compute Engine (DCE) memory controller in a data storage environment contains embedded logic and arithmetic functionality for Boolean logical and arithmetic operations. "Write" or "Read" requests which are received from data generating entities, contain a Physical Address field identifying an address of a data block to be retrieved from the external memory, and a Control bits field identifying a type of computational operation to be performed. The DCE memory controller decodes the request, and applies the desired compute operation autonomically to the contents of an external memory and/or the incoming data without burdening the CPU with the computational activity.

25 Claims, 11 Drawing Sheets

DATA STORAGE SYSTEM EMPLOYING A DISTRIBUTED COMPUTE ENGINE MEMORY CONTROLLER WITH EMBEDDED LOGIC AND ARITHMETIC FUNCTIONALITY AND METHOD FOR DATA MIGRATION BETWEEN HIGH-PERFORMANCE COMPUTING ARCHITECTURES AND DATA STORAGE DEVICES USING THE SAME

REFERENCE TO RELATED APPLICATIONS

This utility Patent Application is based on the Provisional Patent Application Ser. No. 61/782,612 filed on 14 Mar. 2013.

FIELD OF THE INVENTION

The present invention is directed to data storage systems for data migration between data generating entities, for example, high-performance computing cluster architectures, and data storage devices.

In particular, the present invention is directed to data storage systems employing distributed memory controllers containing embedded logic and arithmetic functionality which automatically perform Boolean logic and arithmetic operations on incoming data and/or the contents of an external memory based upon an address range associated with the memory "write" and/or "read" request and an address identifying a desired computational operation.

In overall concept, the present invention is directed to a data storage system and method for transparent computer operations applied to data flowing through the data storage in which a Distributed Compute Engine (DCE) memory controller automatically performs compute operations identified in a PCIe address associated with a received request.

The present invention is further directed to a simplified and inexpensive data storage system which eliminates the use of an expensive CPU (Central Processor Unit) or GPU (Graphics Processor Unit), and which moves the compute capability from the CPU (and/or GPU) into a memory controller.

Further, the present invention is directed to a data storage system compatible with miniaturized and power-saving FPGA (Field-Programmable Gate Array) technology which, when used in conjunction with broadcast capabilities of PCIe switches permits the performance of compute operations in a highly efficient manner, i.e., with zero copies needed. The memory Compute Engine embedded inside the FPGA performs a full range of Boolean logic and arithmetic operations between incoming data flowing across the storage network and data contained in a local external memory.

The present invention is further directed to a data storage system in which the memory controller is integrated with logic and arithmetic functions such as XOR, OR, NOR, AND, NAND, ADD, SUBTRACT, MULTIPLY, DIVIDE, Bit shift, Byte swap, and their combinations including operations with predetermined constants.

BACKGROUND OF THE INVENTION

Computer systems generally employ data storage devices, such as disk drive devices, or solid-state storage devices for storage and retrieval of large amounts of data. The arrays of solid-state storage devices such as flash memory, phase change memory, memristors, or other non-volatile storage units, may also be used in data storage systems.

The most common type of a storage device array is the RAID (Redundant Array of Inexpensive (Independent) Drives). The main concept of the RAID is the ability to virtualize multiple drives (or other storage devices) in a single drive representation. A number of RAID schemes have evolved, each designed on the principles of aggregated storage space and data redundancy.

Most of the RAID schemes employ an error protection scheme called "parity" which is a widely used method in information technology to provide for tolerance in a given set of data. For example, in the RAID-5 data structure, data is striped across the hard drives, with a dedicated parity block for each stripe. The parity blocks are computed by running the XOR comparison on each block of data in the stripe. The parity is responsible for the data fault tolerance. In operation, if one disk fails, a new drive can be put in its place and the RAID controller can rebuild the data automatically using the parity data.

Current RAID engines generally use a CPU (or GPU) with a DMA (Direct Memory Access) capability attached to a large memory to perform XOR operations to generate parity. Typically, data to be striped across a set of drives is first written into the memory buffer of the CPU. The CPU then reads the data back in chunks (blocks) and calculates the XOR of the data to generate parity. The parity XOR data is then written back to the memory, and subsequently is "flashed" to the storage disks. This method requires all of the data to be buffered in the memory of the CPU.

Referring to FIG. 1 representing a typical RAID engine using a centralized CPU for computational operations, when a host 10 sends a "write" data request to storage devices 12, the data is first written to a memory 14 attached to the CPU 16. In this arrangement, the data is sent to a PCIe switch 18 that forwards it to the CPU 16 which in turn passes the data into the memory 14. A memory controller 20 within the CPU 16 controls data writing to and reading from the memory 14.

The CPU 16 reads the data from the memory 14, performs an XOR of the data, and then writes the data back into the memory 14. The CPU 16 then instructs the storage devices 12 to read the data and parity from the memory 14 and saves the data internally. This conventional centralized CPU scheme potentially may experience a sensible bottleneck in data migration through the data storage system.

In this arrangement, all of the data is buffered in the memory 14, thus requiring an overly fast transfer rate of the data in the Memory Interface. This scheme requires the Memory Interface to the CPU to be 3× (+2× for parity) faster than the transfer array of data.

In addition, the reliance of the XOR (or any other requested Boolean logical or arithmetic) operation in this arrangement on an expensive CPU (and/or GPU), as well as the need for an additional software to be written for the CPU (and GPU) operation, results in a complex and expensive scheme, which also has a large footprint and elevated needs for cooling and power consumption.

It is therefore desirable to provide a data storage system with expanded logic and arithmetic functionality beyond RAID, which may perform computations in an efficient, inexpensive, and simple manner without reliance of the compute operation or buffering data in the CPU (or GPU).

SUMMARY OF THE INVENTION

It is therefore an object of the present invention to provide a data storage system capable of Boolean logical and arithmetic computations performed in an efficient and inexpensive way without reliance on buffering data in CPU (or GPU) in a centralized fashion.

It is another object of the present invention to provide a data storage system employing a memory controller with embedded logic and arithmetic functionality for computation operations applied to incoming data and/or the contents of an external local memory. The memory controller may be integrated with an FPGA (Field-Programmable Gate Array) which results in lower cost and power consumption, less cooling requirements and has a small footprint.

It is a further object of the present invention to provide a data storage system and method employing a Distributed Compute Engine (DCE) memory controller, which, when used in conjunction with broadcast capabilities of PCIe switches, results in performing compute operations with zero copies.

It is another object of the present invention to provide a data storage system which employs a memory controller embedded with XOR, NOR, OR, AND, NAND, ADD, SUBTRACT, MULTIPLY, DIVIDE, Bit shift, Byte swap, etc., and combinations thereof.

In addition, it is an object of the present invention to provide a data storage system which merges the computational (both logical and arithmetical) functions into a memory controller for automatic execution of requested logical and/or arithmetic operations based on an incoming PCIe address containing an address range associated with the memory "write" or "read" request and control bits identifying a computation operation desired to be performed.

In one aspect, the present invention represents a data storage system which comprises a Distributed Compute Engine (DCE) memory controller(s) containing embedded computational functionality for Boolean logic and arithmetic operations. The DCE memory controller supports an attached external memory which is addressable via the memory interface.

The external memory supported by the DCE memory controller includes, but is not limited to, various DDR (Double Data Rate) as DRAM (Dynamic Random-Access Memory), SRAM (Static Random-Access Memory), flash memory, etc.

The compute operations may be applied to incoming data and/or the contents of the external memory. The compute operations are automatically performed by the DCE memory controller(s) based upon a PCIe address associated with the requested operation. The DCE memory controller performs conventional "writes" and "reads" on the external memory through the PCIe interface. It also automatically decodes an extended address (Control bits) field which is appended to the addressable range of the external memory contained in the PCIe address received from hosts.

Based upon the decoded contents of the Control bits field of the received PCIe address, the DCE memory controller performs a desired Boolean logic or arithmetic operation between the incoming PCIe data and the data contained in the external memory at the address specified in the PCIe "write" request, as well as Boolean or arithmetic operation on data read from the external memory at the specified address.

The DCE memory controller is deployed in a high speed PCIe network comprised of data generating entities (also referred to herein as hosts), data storage, and a PCIe switch (or switches).

The DCE memory controller further includes a PCIe interface, a Memory Interface with an attached ECC generator and checker, and multiple Controller Blocks connected to a "Write" multiplexer. Preferably a "Read" multiplexer connects outputs of both the Memory Interface and the "Write" multiplexer to the PCIe interface.

The DCE memory controller is equipped with an Address Decode and Control Block residing within each Controller Block. It is a function of the Address Decode and Control Block to determine both the physical memory address and the desired compute operation, if any, based upon the incoming PCIe address.

The attached external memory with $2^n$ address locations, will require "n" address bits in the Physical Address field of the requested PCIe address to access the entire memory. Additional control bits in the Control bits field of the requested PCIe address are required for decoding of the desired compute operation (NO operation/direct WRITE, NOT, AND, NAND, OR, NOR, XOR, ADD, SUBTRACT, MULTIPLY, DIVIDE, etc.).

The DCE memory controller may be integrated with an FPGA (Field Programmable Gate Array) technology, leveraging its logic density, flexibility, and cost effectiveness. FPGA technology facilitates the implementation of a full range of Boolean logic and arithmetic functions integrated with the PCIe interface and the Memory Interface.

The number of bits in the Control bits field required depends upon the available operations desired. The flexible nature of the FPGA technology allows for the range of the Control bits field in the received PCIe address to be variable for the purpose of the subject system. The summation of two bit fields (n bits in the Physical Address field and X control bits in the Control bits field) is presented to the PCIe bus in the format of a virtual address range.

In addition to the Address Decode and Control Block, each Controller Block includes a Readback Buffer, Input Buffer, and a Compute Engine adapted for operations which include but are not limited to: AND, NAND, OR, NOR, XOR, ADD, SUBTRACT, Bit shift left and right, Byte swap, any combination of these operations, and any combination of the operation with predetermined constants, etc.

Upon receiving a PCIe "write" request, the Address Decode and Control Block instructs the Memory Interface to read a block of data from the PCIe specified external Memory address for placement in the Readback Buffer. Simultaneously, incoming PCIe "write" data is placed into the Input Buffer. The Address Decode and Control Block also decodes the desired operation from the Control bits field of the requested PCIe address. It commands the Compute Engine to perform the desired operation on the data written in the Readback Buffer and Input Buffer, and then instructs the Memory Interface to commit the computational result to the external Memory as it flows from the Compute Engine.

The computational result is written to the same address in the external Memory Unit from which the data block was previously retrieved into the Readback Buffer.

The Memory Interface is intercoupled between the Controller Block(s) and the external Memory Unit to transfer data at twice the PCIe data transfer rate. This allows the compute operation to be transparent with no penalty or overhead in system transfer time. As data flows to and from the external Memory, it is protected by an ECC (Error Checking and Correction Code) generator and checker.

A plurality of the Controller Blocks are preferred in the subject DCE Memory Controller in order to handle multiple PCIe operations simultaneously.

Upon receiving a PCIe "read" request, the Memory Interface in the DCE memory controller reads data from the external Memory Unit, as specified in the PCIe address, and passes it to the Readback Buffer. The Address Decode and Control Block decodes the type of the desired operation from the control bits contained in the PCIe address. It commands the Compute Engine to perform the desired operation on the data in the Readback Buffer. The control bits determine the compute operation, which may be any arithmetic or binary operation that requires one operand with additional operands as predefined constants such as, for example, Read, Add, Subtract, Multiply, Divide, Left shift, Right shift, Byte swap, etc. The "read" multiplexer provides for these operations to be performed on-the-fly during the PCIe "read".

Data originating in the external Memory Unit will flow through the Readback Buffer and the Compute Engine before passing through the "Write" multiplexer and "Read" multiplexer to the PCIe Interface. The PCIe "read" transaction may be completed without interruption or time penalty.

Upon completion of the "read" request operation, the resulting data is transferred to the PCIe Interface for presentation onto the PCIe bus. This allows the final result of a single computation or recursive computations to be passed to the data storage via the PCIe bus.

The subject DCE memory controller is provided with the ability to perform mapping of the physical memory (attached external memory) to a virtual memory. Specifically, the DCE memory controller may present a logical (virtual) address range that is twice the size of the physical (external) memory by sharing the virtual memory between competing compute operations. This may be attained through mapping the physical memory to several logical (virtual) memories, where each logical (virtual) memory is allocated for a specific operation, or to a group of specified compute operations (or functions).

For example, the DCE memory controller may allocate a first logical memory, i.e., a first virtual (logical) address range and a second virtual (logical) memory, i.e., a second address range, and during the operation, maps the logical memories to the physical memory in accordance with an operation to be performed.

The subject system employs one or a number of PCIe switches coupled between the host(s) and the DCE memory controller. The PCIe switch is configured as a transparent bridge to forward the "write" or "read" requests from the host(s), along with the PCIe address, to the DCE memory controller for further processing.

The data storage may be built as an array of storage devices, including disk drives or solid-state memory devices, such as, for example, flash memory, phase change memory, memristors, and other non-volatile storage devices.

The DCE memory controller may be placed at different locations of the Storage Network. For example, alternatively to placing the DCE memory controller in connection with the PCIe switch, the memory controller may be integrated with each of the data storage devices in the storage array, or with the hosts for pushing data from a host bus adapter.

The present system additionally constitutes a method for data storage migration which is carried out through the steps of:

embedding a plurality of Controller Blocks into a Memory Controller, where each Controller Block includes a first Buffer, a second Buffer, and a Compute Engine coupled (by inputs thereof) to the first and second Buffers, and coupling each of the plurality of Controller Blocks between at least one host and an external Memory Unit.

The method continues with receiving, from a host, a "write" and/or "read" request and a PCIe address associated with the requested operation. The PCIe address includes a Physical Address bits field and a Control bits field. The Physical Address bits field corresponds to the address of data of interest in the external Memory Unit, while the Control bits field identifies a required computational function (operation).

The method provides presentation of a logical (virtual) address range to be several times larger than the size of the physical external memory unit by mapping the virtual memory to the physical memory in a manner which permits sharing the physical memory by competing processes. For this purpose, an Address Decode and Control Block (Unit) in the Controller Block analyzes the Control bits field in the PCIe address to determine what type of operation is to be performed, and generates a corresponding control signal submitted to the Control Engine.

The method performs mapping between the virtual memory and the physical memory by the Address Decode and Control Block Unit. For example, in the case of competing operations, corresponding to the same physical address in the external Memory Unit, one operation is mapped to one virtual memory address range while another operation is mapped to another virtual memory address range.

Upon receiving a PCIe "write" request from a host (or hosts), and decoding (by the Address Decode and Control Block (Unit)) an address of a data block in the external Memory Unit and a desired computational operation, the method proceeds with the following operations:

instructing, by the Address Decode and Control Block, the Memory Interface to read a data block at the address specified in the PCIe address for placement in the Readback Buffer, and placing incoming PCIe "write" data into the Input Buffer, commanding the Compute Engine in the Controller Block to perform the desired operation on the data written in the Readback and Input Buffers, and, instructing the Memory Interface to commit the computational result to the external Memory Unit as it flows from the Compute Engine.

The compute operation is completed by writing the resulting block of data at the same memory address in the external Memory Unit from which the data block was previously retrieved into the Readback Buffer.

Upon receiving a PCIe "read" request, the method is carried out through the steps of:

instructing the Memory Interface in the DCE memory controller to read data from the external Memory Unit as specified in the PCIe address and passing the data to the Readback Buffer, commanding the Compute Engine to perform the desired operation on the data in the Readback Buffer, and passing the result of the computation through the "write" and "read" multiplexers to a PCIe Interface to be further transferred to the data storage via a PCIe bus.

Data migration and processing is enhanced by providing a plurality of Controller Blocks, thus permitting handling of multiple PCIe operations simultaneously. While reading data from the external Memory Unit to the Readback Buffer of at least one of the plurality Controller Blocks, the "write" data from the host may be written at the Input Buffer of another of the plurality of Controller Blocks.

A "write" multiplexer is coupled between the plurality of Controller Blocks and the external Memory Unit, thus facilitating the transmission of the computational results in a coordinated manner.

Additional error protection is provided through the steps of:

applying ECC (Error Checking and Correction) procedures to the computational results transferred from the Controller Blocks to the external Memory Unit, and to the data migrating from the external Memory Unit to the data storage.

These and other objects and advantages of the present system and method will be readily seen upon reading the following detailed description of the preferred embodiment in conjunction with the drawings figures.

DETAILED DESCRIPTION OF THE INVENTION

Figure 1:
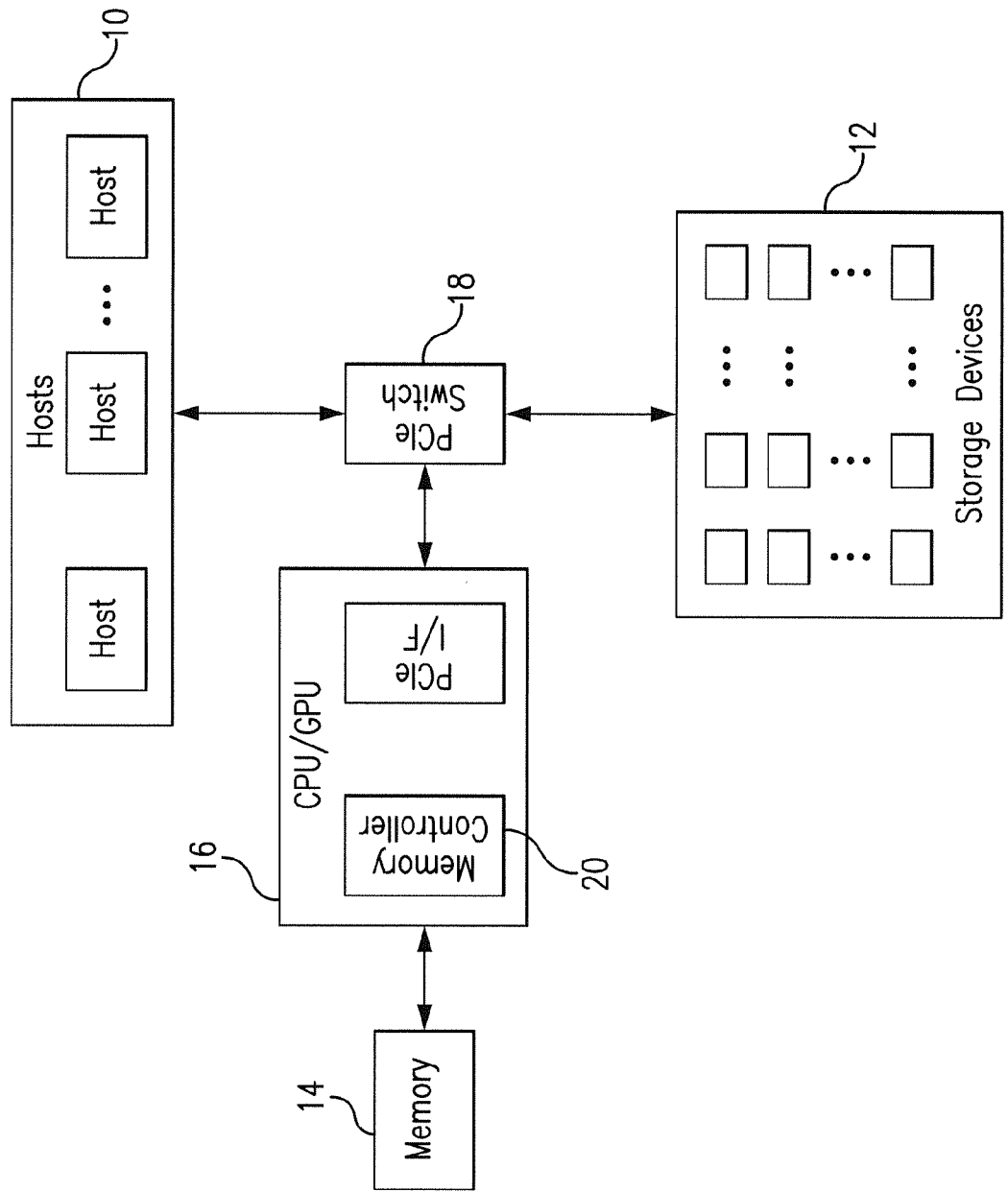
FIG. 1 is a schematic representation of the data storage system of the prior art.

Referring to FIGS. 2, 7A-7B, and 8, the system 30 of the present invention provides data storage for hosts (data generating entities) 32 in an array of storage devices 34. Computer clusters, groups of linked computers, as well as single computers, involved in extended computations, may be linked by a high-speed network that permits sharing of computer resources and memory. Data transfers to and from the computers may be performed through a high-speed PCIe switch bus 36. Any computer within the computer clusters, as well as groups of linked computers may serve as hosts.

The operation of computer clusters, as well as single computers (i.e. the hosts) requires data writing to and reading from the storage devices. The process of data transfer is carried out during the I/O cycle of the computers. The size of computer clusters and the aggregate I/O bandwidths that are to be supported may require thousands of data storage devices for servicing the computing architecture.

During operation, a virtualized Compute Engine 38 applies required calculations (logical and arithmetical) to data ingress from a data generating entity prior to "writing" the data in the storage devices 34 or to the data "read" from the storage device 34.

The system 30 is a data storage system employing a Distributed Compute Engine memory controller 40 (further referred to herein also as DCE memory controller) containing embedded logic and arithmetic functionality for Boolean logical (NOR, AND, NAND, OR, NOR, XOR) and arithmetic (ADD, SUBTRACT, MULTIPLY, DIVIDE) operations applied to incoming data (when requested) and/or the data already recorded in an external Memory Unit 44 coupled to the DCE memory controller 40.

Figure 2:
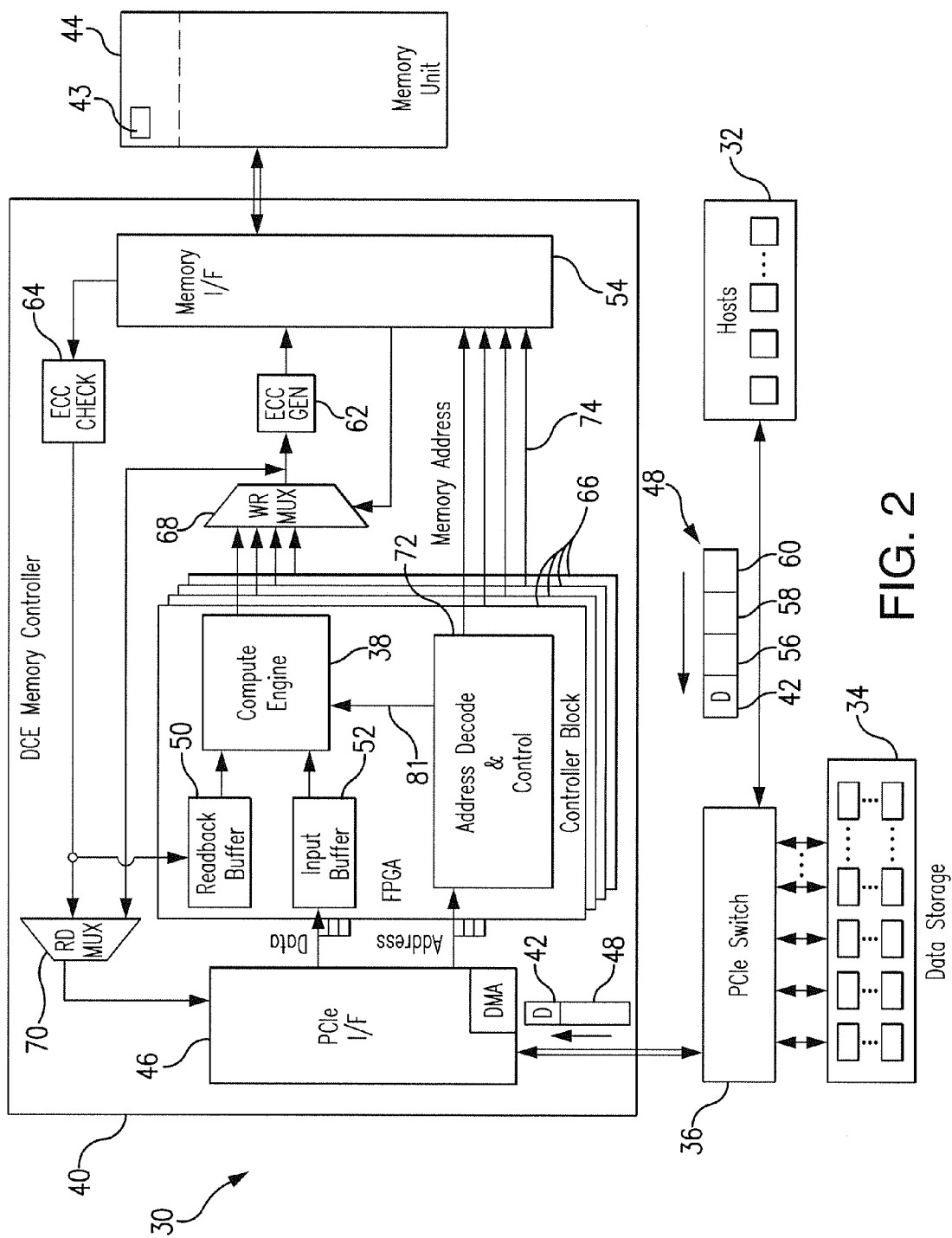
FIG. 2 is a schematic representation of the data storage system using the Distributed Compute Engine (DCE) memory controller with embedded compute capability of the present invention.
Figure 3:
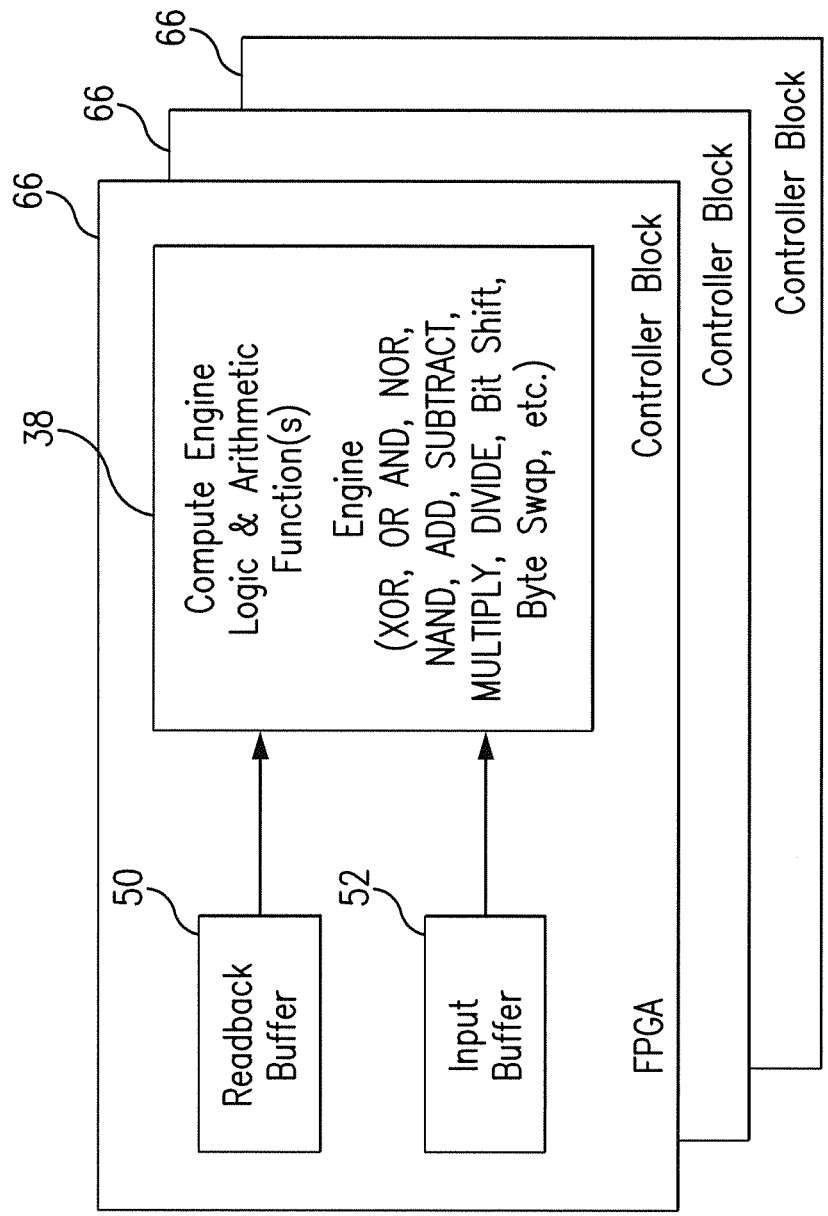
FIG. 3 is a schematic representation of the Controller Blocks of the DCE memory controller of the present invention adapted for logic and arithmetic operations.

As shown in FIG. 2, the Compute Engine 38 in the DCE memory controller 40 is configured to perform a wide variety of logical and arithmetic operations between the incoming data 42 being written and the data 43 currently in the Memory Unit 44, as well as operations only on the data 43 read from the Memory Unit 44. The logical and arithmetic operations are contemplated to be entirely autonomic, i.e., the compute operations are supported at the DCE memory controller 40 without using buffering in a centralized CPU (or GPU).

The present system 30 transfers the computational aspect of the data storage out of the centralized CPU design into the local external memory 44 and thus reduces the centralized CPU (or GPU) memory accessing, thereby avoiding the bottleneck associated with various compute operations if performed by means of a conventional centralized CPU (or GPU).

As presented in FIGS. 2-3, 7A-7B, and 8, the Compute Engine 38 in the subject DCE memory controller 40 is configured to apply compute operation on data written at least in one of the buffers 50 and 52 in any manner, including AND, NAND, OR, NOR, XOR, ADD, SUBTRACT, BIT shift left and right, Byte swap, and any their combination including the operations with predetermined constants.

The compute operations in the present system are automatically performed by the DCE memory controller 40 based upon the PCIe address 48 (shown in FIG. 2) incoming from the host(s) and associated with the required operation.

The DCE memory controller 40 presents the external Memory Unit 44 to be addressable via a PCIe interface 46 for expedited data access. The DCE memory controller 40 can perform conventional "writes" and "reads" of the external memory unit 44 through the Memory Interface 54.

Figure 4:
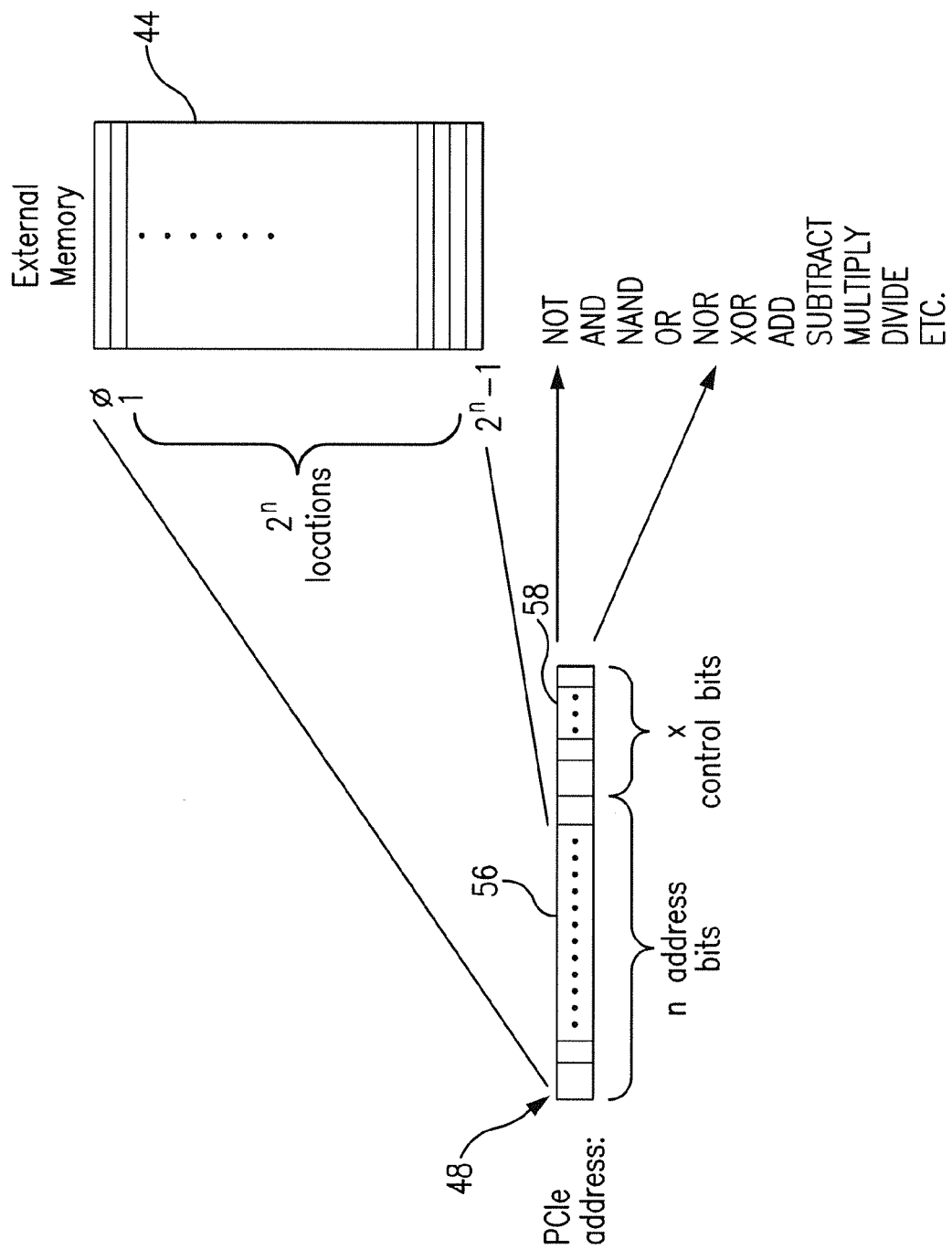
FIG. 4 is a schematic representation of the PCIe address format adapted for the operation of the DCE memory controller of the present invention.

The DCE memory controller 40 automatically decodes the PCIe address 48 received from the hosts 32. As shown in FIGS. 2 and 4, the PCIe address 48 includes a Physical Address field 56 and a Control bits field 58. The PCIe address 48 also may contain an unused field 60 for extraneous purposes.

When receiving the PCIe address 48 from the host(s) 32 through the PCIe switch bus 36 and the PCIe Interface 46, the DCE memory controller 40 automatically decodes the Physical Address field 56 corresponding to the data address in the Memory Unit 44, and decodes the Control bits field 58 which defines what type of a compute operation is to be applied to the data.

Based upon the decoded contents of the Control bits field 58, the DCE memory controller 40 commands the Compute Engine 38 to perform a required Boolean logic and/or arithmetic operation towards the incoming PCIe data 42 and/or the data 43 retrieved from the external Memory Unit 44 at the address specified in the PCIe "write" request.

Specifically, as shown in FIG. 2, the DCE memory controller 40 may be employed in a high speed PCIe network, comprised of the hosts 32, data storage 34, and PCIe switch (or switches) 36. The DCE memory controller 40 uses the PCIe Interface 46 and the Memory Interface 54 with an attached external ECC (Error Checking and Correction) generator 62, ECC checker 64, and multiple Controller Blocks 66 coupled to a "Write" multiplexer 68. A "Read" multiplexer 70 connects both the Memory Interface 54 and the "Write" multiplexer 68 to the PCIe interface 46.

The DCE memory controller 40 is adapted to control the flow of data to and from the attached Memory Unit 44 of any type, including, but not limited to, DDR (Double Data Rate), Static Random Access Memory (SRAM), Flash memory, etc.

For example, when adapted for DDR memory the DCE memory controller 40 permits twice the data to be transferred without increasing the memory clock rate.

When operating as a SRAM memory controller, the subject system attains an improved SRAM bandwidth (due to the use of inverters for driving bit lines), higher speed of operations (due to the acceptance of all address bits at a time), and easily detectable small voltage swings (due to differential signaling permitted by the symmetric structure of SRAMS).

Flash memory also may be used as a part of the DRAM (Dynamic Random Access Memory) unit. Although operating somewhat slower than the conventional DRAM, the operation with the Flash memory uses less power and is significantly cheaper in operating costs.

The DCE memory controller 40 is equipped with an Address Decode and Control Block 72 residing within each Controller Block 66. One of the functions of the Address Decode and Control (or Unit) Blocks 72 is to determine both the physical memory address (found in the Physical Address field 56) and desired compute operation (found in the Control bits field 58), by decoding the incoming PCIe address 48.

As shown in the FIG. 4, the attached external Memory Unit 44 with $2^n$ address locations requires "n" address bits in the Physical Address field 56 of the PCIe address 48 to access the entire memory 44. The additional "x" bits in the Control bits field 58 are required for decoding of the desired compute operation (NO operation/direct write, NOT, AND, NAND, OR, NOR, XOR, ADD, SUBTRACT, MULTIPLY, DIVIDE, etc). The number of control bits in the field 58 of the PCIe address 48 required for identification of the compute function requested depends upon the available operation desired to be performed. The summation of two bit fields, i.e. the Physical Address bit field 56 and the Control bits field 58, is presented to the PCIe switch bus 36 in a format of a virtual address range.

A logical (virtual) address is the address at which an item (memory cell, storage element, network host) appears to reside from the perspective of an executing application program. The logical address can only indicate a memory location of the data but is not directly associated with it. The memory controller 40 generates the logical address.

A logical address may be different than the physical address. The Address Decode and Control Block 72 in the memory controller 40 provides the function of virtual memory mapping to the physical memory, i.e., the address translation between logical address and the physical address.

The physical address of the memory unit 44 may be mapped to different logical addresses for various purposes. In the subject system, the same physical memory address may appear at two or more different logical addresses, for example, for different types of operations, thus attaining the logical memory that is multiple times the size of the physical memory.

The Address Decode and Control Unit 72 in the memory controller 40 is configured to execute the mapping procedure between the virtual memory and the physical memory in the subject system in a manner that presents a memory address range on the PCIe bus 74 two or more times the actual size of the attached external memory 44.

Figure 5:
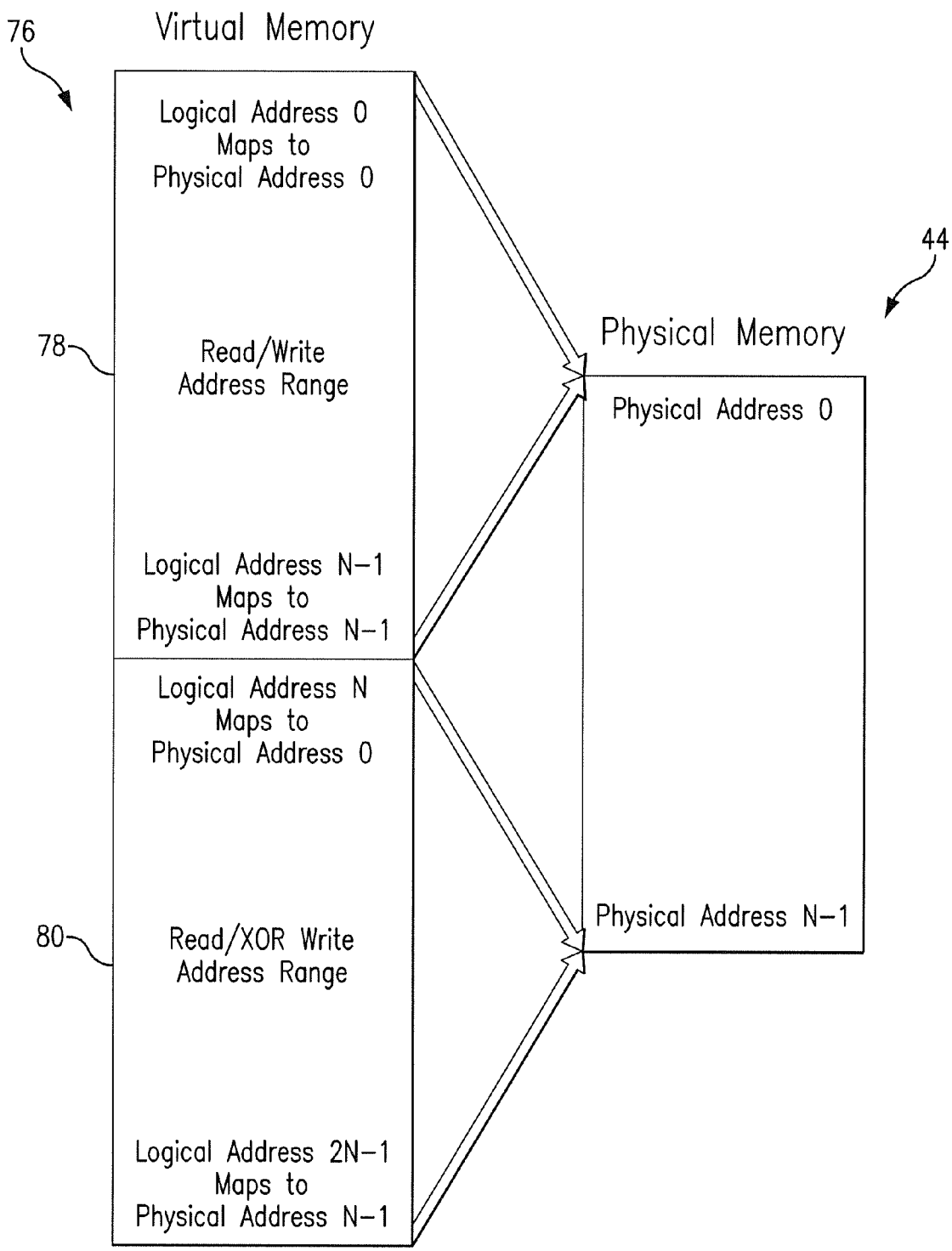
FIG. 5 illustrates the principles of mapping of logical memory addresses to their physical counterparts in the system of the present invention.

As presented in one possible implementation in FIG. 5, the mapping between the virtual memory 76 and the external Memory Unit 44 allows the external Memory Unit 44 to be mapped as a device that is 2× its actual size. If, for example, two competing compute operations are to be performed with respect to data having the same physical address in the Memory Unit 44, each of the operations may be mapped to a corresponding half (78 or 80) of the virtual memory 76.

Figure 6:
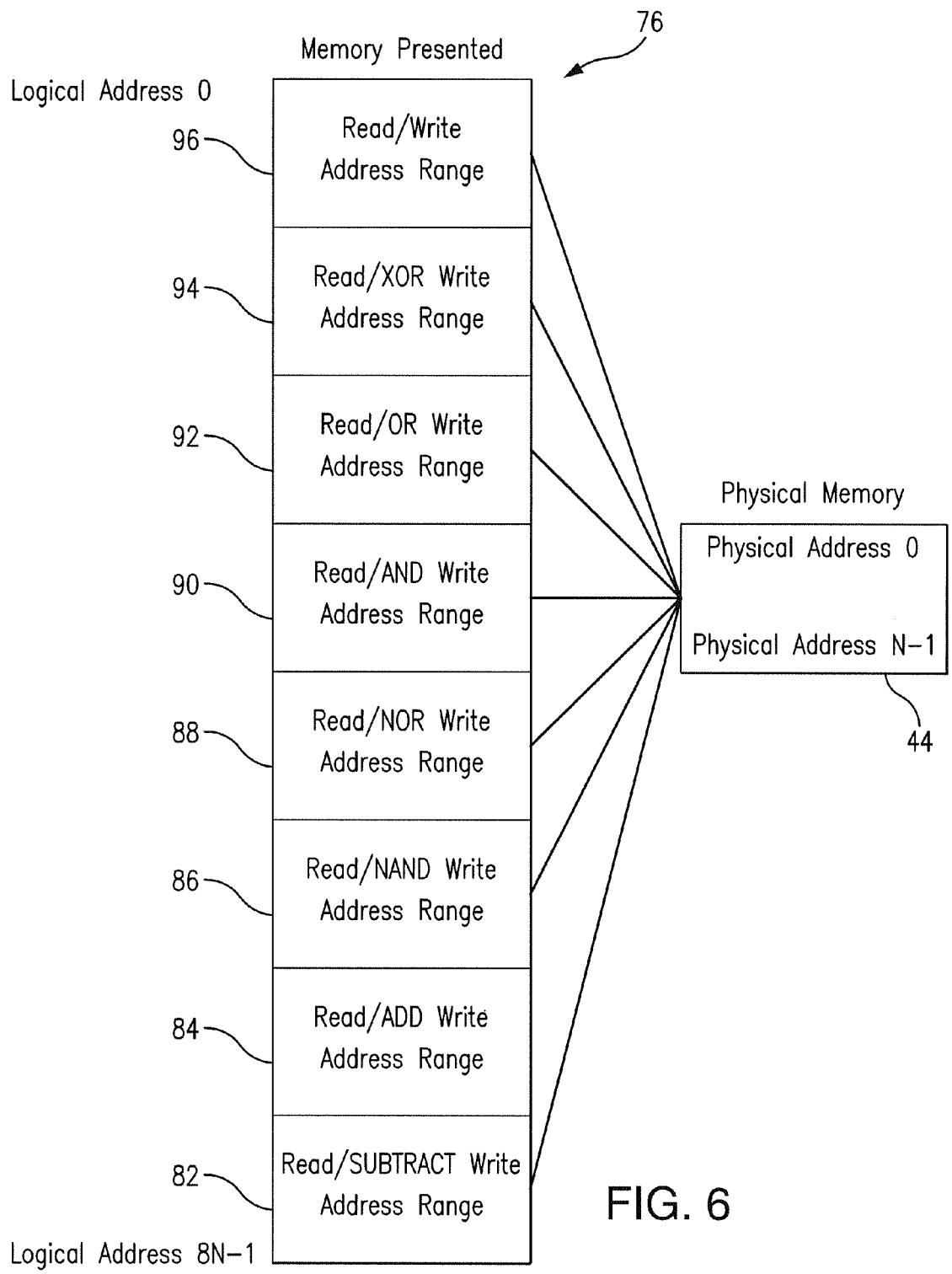
FIG. 6 represents an example of the DCE memory controller of the present system illustrating a number of logical (virtual) address ranges each associated with a different logical operation on the "write" request of the data.

The memory controller is configured to present any number of logical address ranges in the virtual memory, wherein each logical address range performs a different logical operation on the data. As an example only, but not to limit the scope of the present invention to the illustrated implementation, FIG. 6 illustrates 8 (eight) logical address ranges of the virtual memory, i.e., "Read/SUBTRACT Write" 82, "Read/ADD Write" 84, "Read/NAND Write" 86, "Read/NOR Write" 88, "Read/AND Write" 90, "Read/OR Write" 92, "Read/XOR Write" 94, and "Read/Write" 96 mapped to the physical Memory 44.

Referring again to FIG. 5, in one of alternative arrangements of the mapping scheme employed in the subject system, the memory controller 40 maps the physical memory 44 to two logical address ranges (0 and 1), i.e. the virtual address range 78 and 80 respectively, to facilitate sharing of the physical memory between competing processes as they require. For example, a "Write" to each virtual memory address range (78 or 80) may be mapped to the same underlying physical address range, but the memory controller logically "separates" the requested processes.

The lower (0) address range 78 in the virtual memory 76 is used to allow for "Read" and "Write" operations at a normal speed. The second (1) address range 80 in the virtual memory 76 may be allocated for "Reads" at normal speed and, for example, "XOR writes" at ½ the normal speed. This arrangement permits the efficient servicing of competing processes, i.e., for example, when the memory controller 40 has to read the data from the memory 44 in order to apply a requested computing operation to the incoming data, and then write the data to the memory 44 as will be detailed in further description.

To illustrate the "logical separation" concept for the competing processes, the competing operations corresponding to different virtual address ranges 78 and 80, respectively, may be mapped to the same physical address, as long as different types of operations are performed.

For example, if the "write" operation and the "XOR write" operation are to be performed in competing fashion, the "write" operation to the logical address 0 (in the virtual address range 78) is mapped to physical address 0, and the "XOR write" operation to the logical address N (in the virtual address range 80) is mapped to the physical address 0 (the same physical address as the competing "write" operation).

Similarly, the "write" operation to the logical address N−1 (in the virtual address range 78) maps to the physical address N−1, and the "XOR write" operation to the logical address 2 N−1 (in the virtual address range 80) maps to the physical address N−1 (the same physical address as the competing "write" operation).

The Address Decode and Control Unit 72 residing at each Controller Block 66 uses the extra control bits founded in the Physical Address field 58 of the PCIe address 48 received from the PCIe Interface 46 to determine what type of logical operation is to be performed. Subsequently, the Address Decode and Control Unit 72 generates a control signal 81 that indicates the operation to be performed to the Compute Engine 38. Depending on the type of the operation requested, the DCE memory controller 40 performs the mapping between the virtual and physical memories.

The memory controller 40 includes multiple copies of the Controller Block 66, each of which is a logic function unit which includes the Readback Buffer 50, the Input Buffer 52, and the Compute Engine 38. The Compute Engine applies requested computation(s) to the data contained in buffers 50 and 52, or in one of the buffers, as required by the requested compute operation, and the results of the computation are transferred either to the external Memory Unit 44 or to the Data Storage 34. Multiple copies are necessary to ensure constant availability of the DCE Memory Controller function on the PCIe bus for both writes and reads. Implementation of the DCE Memory Controller within an FPGA allows these additional copies to be added at minimal additional expense. Additional logic would prevent address range conflicts between blocks.

The Address Decode and Control Unit 72 in each copy of the Controller Block 66 is connected to the PCI interface (I/F) 46 for interception of the "write" and "read" data request address. Each controller block 66 is coupled by its output, to the "Write" Multiplexer 68.

The ECC (Error Correction Code) generator 68 is coupled between the Controller Blocks 66 (through the "Write" Multiplexer 68) and the Memory Interface 54. The ECC (Error Checking and Correction) checker 64 is coupled between the Memory Interface 54 and the PCIe interface 46. Both the ECC generator 62 and ECC checker 64 are configured to protect data migrating therethrough by checking for errors and, when necessary, correcting "on the fly".

The ECC principles are known to those skilled in the art, and are not detailed herein. The ECC procedure increases the reliability of the subject storage system practically without extra cost. As an example, Reed-Solomon Codes may be implemented which are able to detect and restore "erased" bits, as well as incorrect bits.

The "Write" multiplexer 68 facilitates data migration between the plurality of the Controller Blocks 66 and the Memory Unit 44 through coordinating parallel reading, writing and processing data in different controller blocks 66.

Each of the Controller Blocks 66 may be integrated with an FPGA for further improving the performance characteristics, costs and power consumption, as well as the scale of miniaturization of the present system. The FPGA technology is capable of providing the implementation of the full range of Boolean logic and arithmetic functions integrated with the PCIe Interface 46 and the Memory Interface 54, which permits the subject DCE memory controller 40 to perform requested operations between incoming data flowing across the storage network and data contained in the external memory.

Figure 7A:
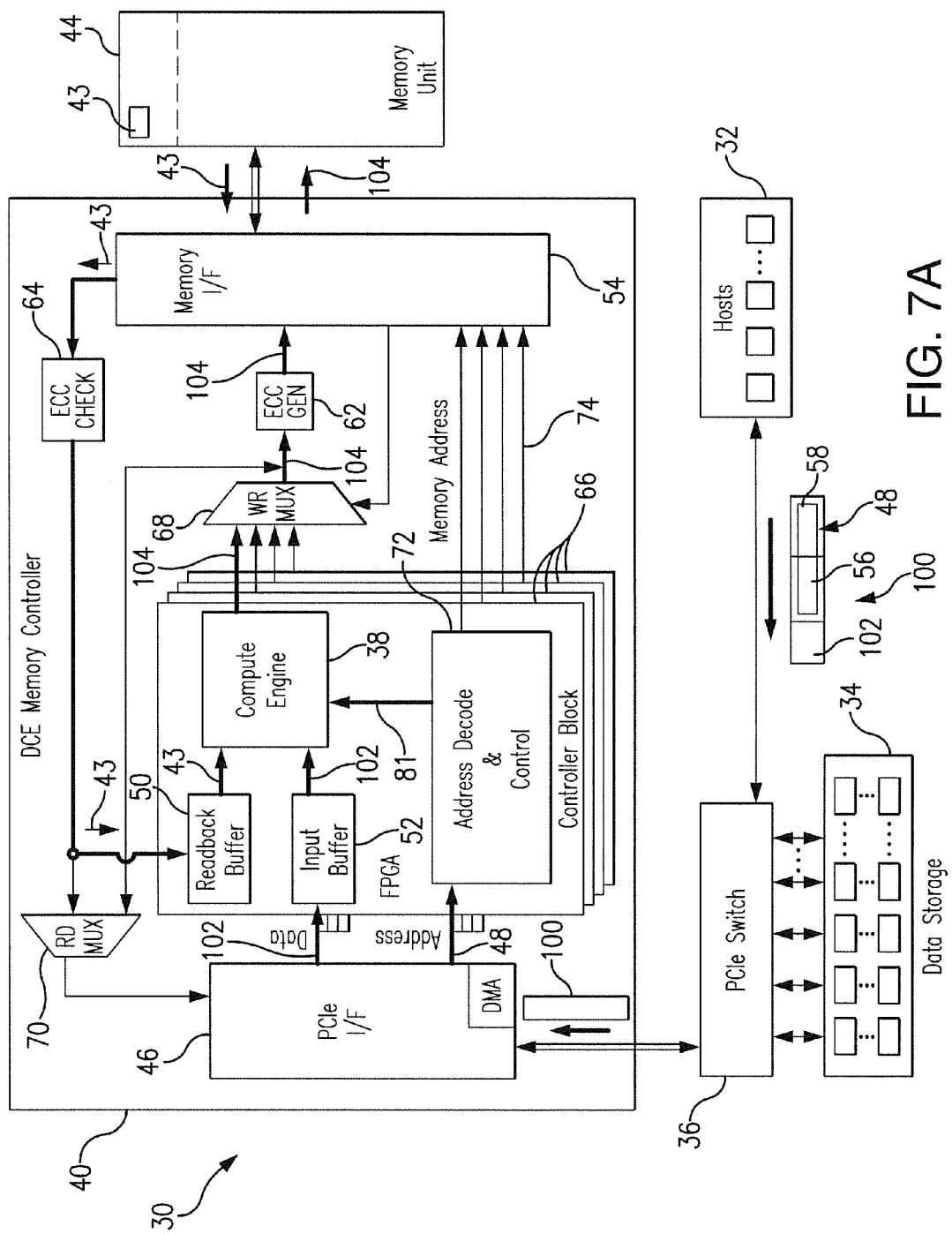
FIG. 7A is a schematic representation of the data storage system of the present concept showing the flow of data during servicing a data "write" request.

Referring to FIG. 7A, illustrating the subject system in the operational mode servicing the "write" request, the hosts 32 send a PCIe "write" request 100 to the storage devices 34 through the PCIe switch bus 36. The "write" request 100 contains the PCIe address 48 which through the PCIe switch bus 36 and the PCIe interface 46 passes to the Address Decode and Control Block 72 which decodes the PCIe address 48 and instructs the Memory Interface 54 to read a block of data 43 from the memory address specified in the Physical Address field 56 of the PCIe address 48 to pass the block of data from the external Memory Unit 44 through the ECC checker 64 for placement in the Readback Buffer 50. Simultaneously, the incoming PCIe data 102 in the "write" request 100 is placed into the Input Buffer 52.

The Address Decode and Control Block 72 additionally decodes the desired operation found in the Control bits field 58 of the PCIe address 48. The Address Decode and Control Block 72 sends the control signal 81 to the Compute Engine 38 to initiate the desired operation on the data 43 written in the Readback Buffer 50 and the data 102 written in the Input Buffer 52 and subsequently instructs the Memory Interface 54 to commit the computational result 104 of the logical operation flowing from the Compute Engine 38 via the "write" MUX 68 and the ECC generator 62 to the external Memory Unit 44. The result 104 of the computation is written at the same address from which the data block 43 was previously retrieved to be written into the Readback Buffer 50.

The external Memory Interface 54 is designed to transfer data at twice the PCIe data transfer rate. This allows the compute operation to complete transfer transparently with no penalty or overhead in the system transfer time. As data flows to and from the external Memory Unit 44, the ECC generator 62 and checker 64 protects it. The availability of a plurality of the Controller Blocks 66 permits the DCE memory controller 40 to handle multiple PCIe operations simultaneously through the "Write" multiplexer 68.

The Memory Interface 54 between the Controller Blocks 66 and the external Memory Unit 44 is required to be 2× the transfer rate of the PCIe switch 36 to maintain the data transfer at full speed. To allow constant data activities on the PCIe switch bus 36, the multiple copies of the Controller Block 66 cooperate each with the other. While one copy of the Controller Block 66 may read data from the external Memory Unit 44 to the Readback Buffer 50, another copy of the Controller Block 66 may be receiving the incoming data 102 from the PCIe switch 36 to the Input Buffer 52. The number of the Controller Blocks 66 necessary for stable and effective data migration and processing depends upon the data transfer rates of the PCIe bus 74 and the Memory Interface 54 for a particular application.

Figure 7B:
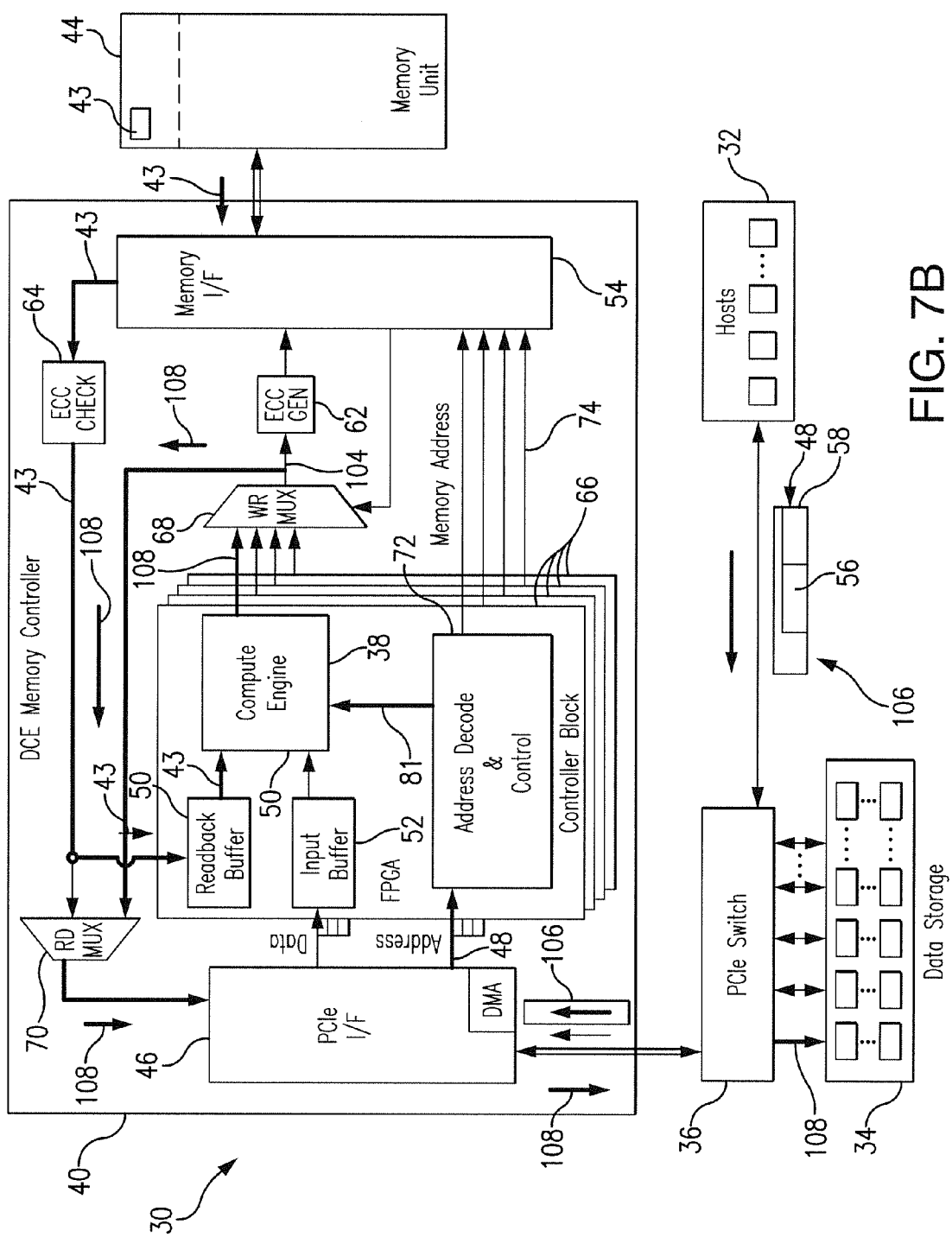
FIG. 7B is a schematic representation of the present data storage system showing the flow of data during servicing of a data "read" request.

Referring to FIG. 7B, illustrating the subject system in the operational mode corresponding to servicing of a "read" request, upon receiving a PCIe "read" request 106 form the hosts 32, the Memory Interface 54 and the DCE memory controller 40 reads data 43 from the external Memory Unit 44 at the address specified in the PCIe address 48, particularly in the Physical Address field 56, and passes data 43 to the Readback Buffer 50. The Address Decode and Control Unit 72 also decodes the desired operation identified in the Control bits field 58 of the PCIe address 48 associated with the read request 106. The Address Decode and Control Block 72 commands the Compute Engine 38 to perform the desired operation on the data 43 written in the Readback Buffer 50. The operation may be any arithmetic and/or binary operation that requires one operand with one or more operands as predefined constants (READ, ADD, SUBTRACT, MULTIPLY, DIVIDE, Left shift, Right shift, Byte swap, etc.).

The number of bits in the Control bits field 58 depends upon the available operations desired. The "Read" multiplexer 70 permits operations to be performed on-the-fly during the PCIe "read". Computational result 108 flows from the Compute Engine 38 through the "write" multiplexer 68, and subsequently the "Read" multiplexer 70, to the PCIe Interface 46. This process permits the PCIe "read" transaction to be completed without interruption or time penalty.

The result 108 of computation on the data block 43 is transferred to the PCIe interface 46 for presentation onto the PCIe switch bus 36 to permit the final result 108 of a single computation or recurrent computations to be passed to the data storage 34 through the PCIe switch bus 36.

Although the present invention is applicable to any type of the data storage and migrating system, as an example, but not to limit the scope of the invention to this particular embodiment, the data storage system may be based on RAID (Redundant Array of Independent Disks) data migration principles in which the DCE memory controller automatically performs XOR operations on incoming data. RAID systems use arrays of independent storage devices and employ a combination of mirroring and/or striping techniques for providing protection against lost data. For example, in some modifications of the RAID systems, data is interleaved in stripe units distributed with parity information across all of the storage devices (disk drives or solid-state memories).

A parity scheme in the RAID systems utilizes a two-dimensional XOR algorithm. Parity blocks are usually computed by using logical comparison called XOR (Exclusive OR) on binary blocks of data. An XOR comparison takes two binary bits, represented as 0 and 1, compares them and outputs an XOR result of "0" or "1". The XOR engine returns a "1" only if the two inputs are different if both bits are the same, i.e. both zeros or both ones, the output of the XOR range would be 0.

The parity blocks are computed by running the XOR comparison on each block of data in the stripe. This means that the first two blocks are XOR-ed, then the result is XOR-ed again, the third block, and the XOR comparison continues for all drives in the array, except for the block where the parity is stored.

The principles of the present invention are fully applicable to generating parity blocks with the Compute Engine 38 configured to perform XOR operation on the data in the Readback Buffer 50 and the Input Buffer 52. In operation, a virtualized Compute Engine 38 configured as the RAID engine applies RAID calculations to data ingress from a data generating entity prior to "writing" the data in the storage devices 34.

Figure 8:
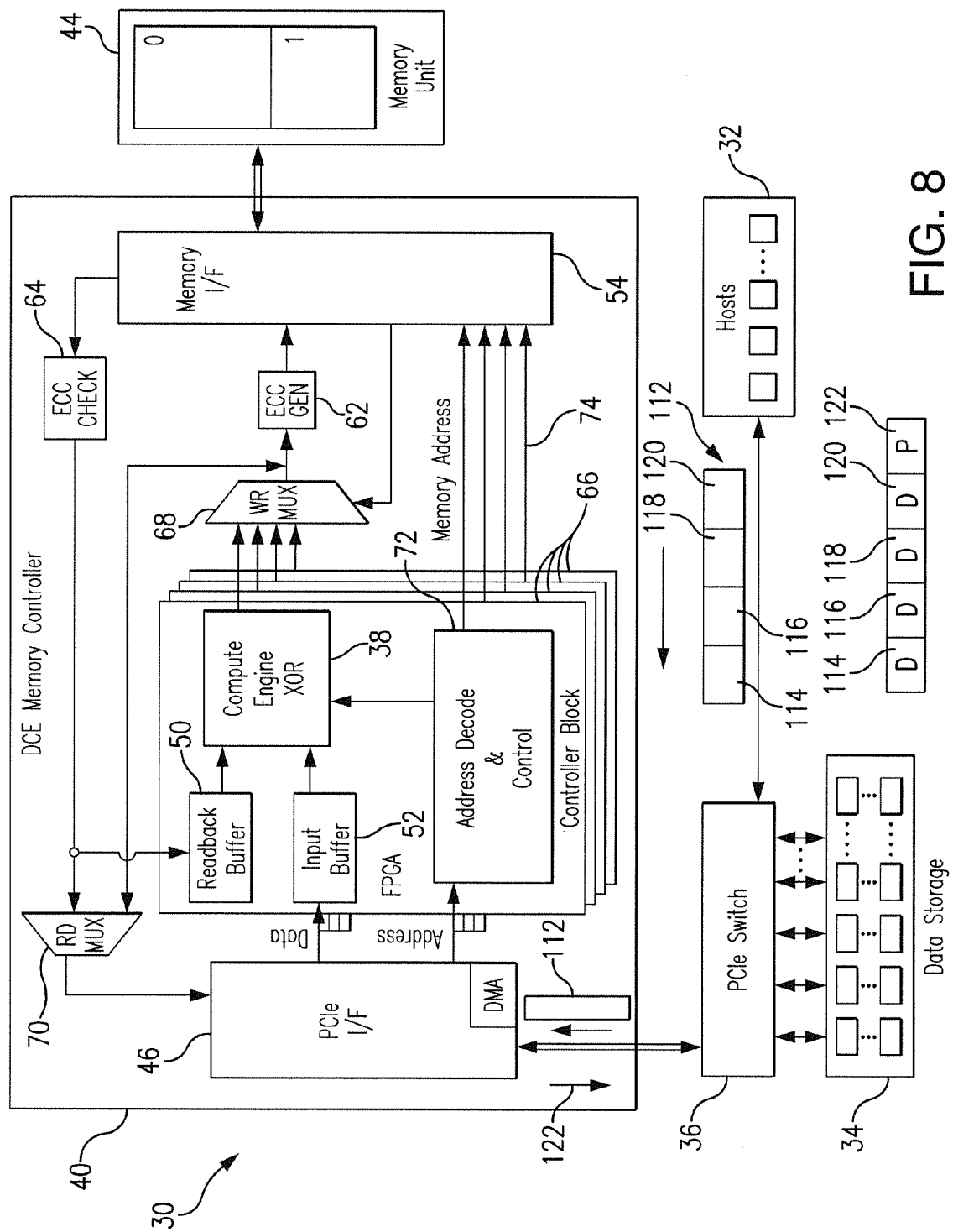
FIG. 8 is an example of the present data storage system adapted for XOR computations.

As shown in FIG. 8, the hosts 32 issue a "write" request 112 in the form of blocks 114, 116, 118 and 120. The hosts 32 may request to "write" the first block 114 of the data 112 using for example, the Address Range 0 in the Memory Unit 44, and subsequent data hocks 116, 118, and 120 using the Address Range 1 in the Memory Unit 44.

As part of the RAID calculations in the Compute Engine 38, parity values are calculated for the ingress data. The RAID unit allocates space in the data storage devices 34 for the data (D) and the parity values (P).

In order to use the subjects system for parity generation through the XOR computations, the PCIe switch 36 forwards the "write" data 112 to the storage devices 34, and mirrors a copy 112 of the "write" data 112 to the DCE memory controller 40.

The DCE memory controller 40 receives the first block 114 of the data 112 on a PCIe interface 54, and writes the data into the Input Buffer 52.

The Address Decode and Control Unit 72, upon intercepting the Address of the ingressing data, decodes (based on Address Range 0 or Address Range 1), and provides correct control signals to the Multiplexer (MUX) 68.

During the first Data block 114 write, the MUX 68 feeds all ZEROs to the Compute Engine 38. Data from the Input Buffer 52 will be XOR-ed with all ZEROs and committed to the Memory Unit 44.

During subsequent data block writes, the previous data block (for the first data block 114, or a XOR result written in the Memory 44), is read from the Memory 44 upon each data block "write" request being received from the host 32. The data block, or the XOR result, is "fetched" from the memory 44 to be buffered in the Readback Buffer 50.

When any subsequent data block is buffered in Input Buffer 52, the MUX 68 is signaled to use data from the Input Buffer 52 and the Readback Buffer 50 to be XOR-ed using the Compute Engine 38 which is configured to perform, among other operations, the XOR calculations. The resultant XOR result is committed to the Memory Unit 44 at the same address the previous data (or previous XOR result) was read from. This process is repeated until all data blocks 114, 116, 118, and 120 in the "write" request 112 have been processed.

When all of the data blocks 114-120 of the Data 112 have been processed in the DCE memory controller 40, and the XOR parity value 122 has been calculated and written in the Memory Unit 44, the host 32 sends a request to the storage devices 34 to read the parity XOR data 122 from the Memory 44.

The present structure requires the Memory Interface to be only 2× the data transfer rate in comparison with 3× (+2× the parity) of the traditional RAID engine using CPU for XOR calculation.

Depending upon the location of the DCE memory controller 40 within the storage network, it may be configured to receive data from the hosts 32, or alternatively it may be configured with a DMA (Direct Memory Access) controller 110 of the PCIe interface 46 in order to pull data from the hosts 32.

Figure 9:
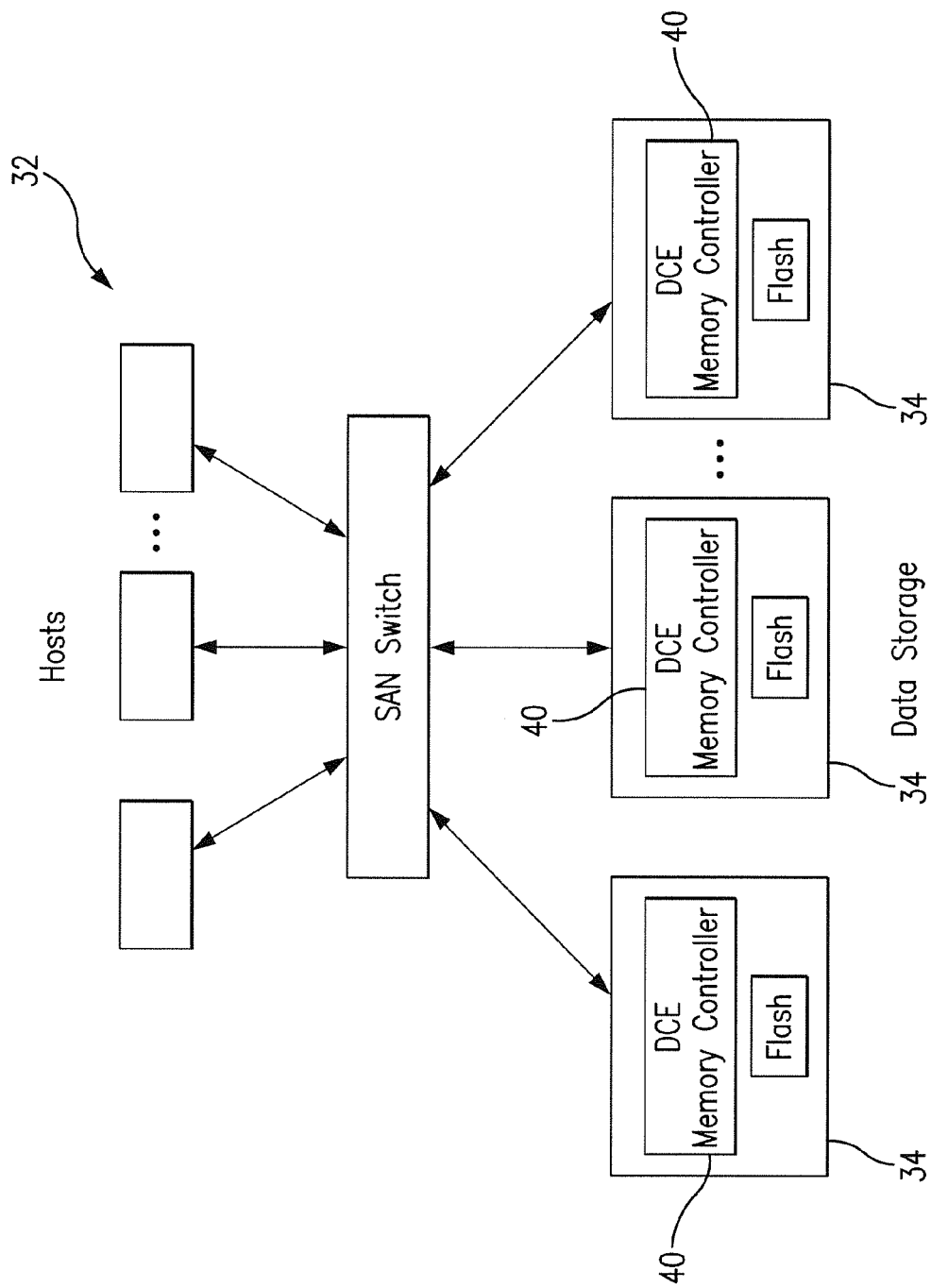
FIG. 9 is an alternative embodiment of the subject DCE memory controller embedded in the data storage.

Referring to FIG. 9, showing one of the implementations of the current data storage system with the DCE memory controller 40 embedded into the storage devices 34, the subject data storage system provides for tight integration with flash storage device, phase change memory, memristor, or other non-volatile storage, and is capable of scaling, generally with the addition of more storage devices.

Figure 10:
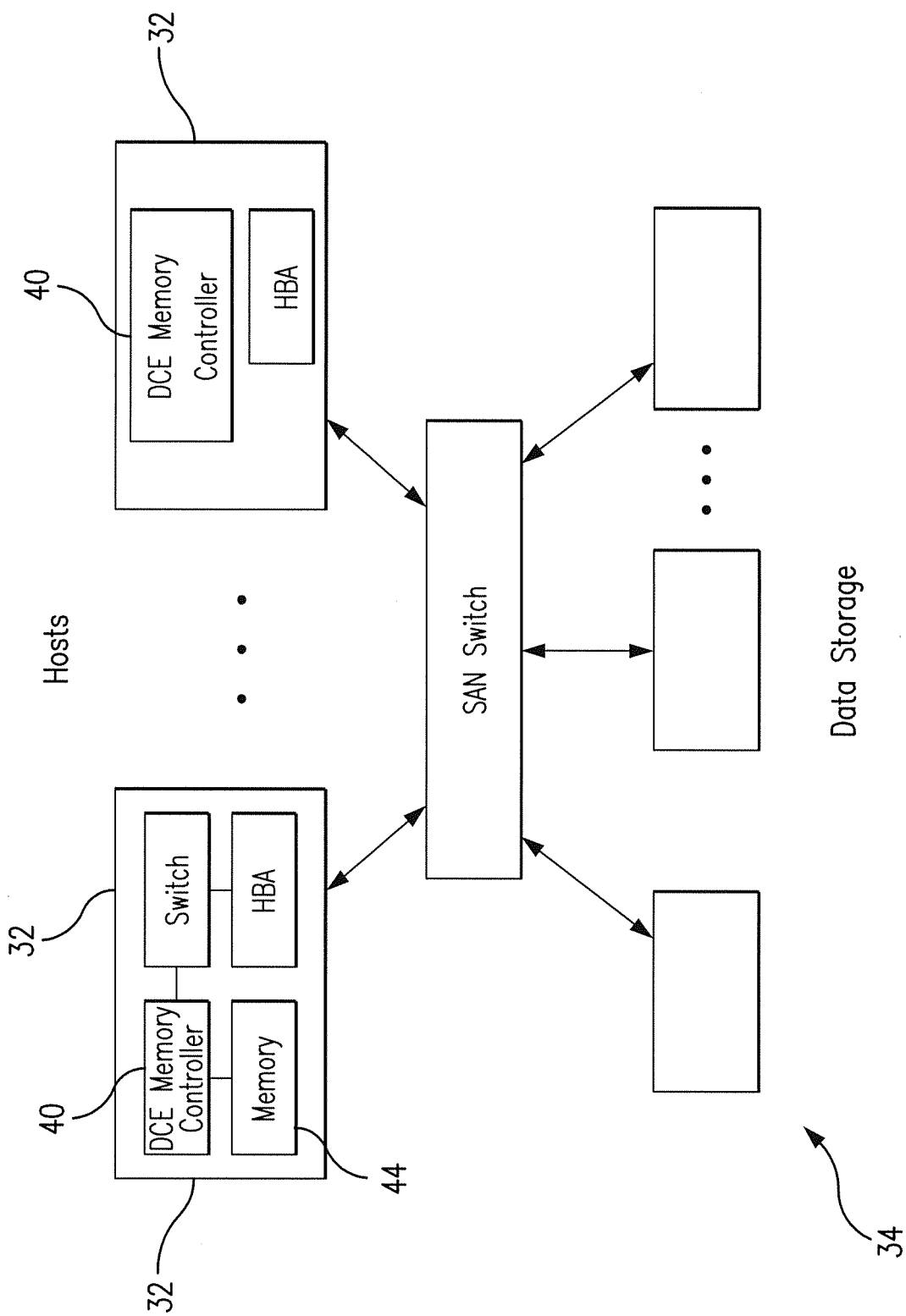
FIG. 10 is another alternative embodiment of the subject DCE memory controller embedded with the host HBA.

Referring to FIG. 10, another alternative embodiment of the data storage system of the present invention is presented where the DCE memory controller is embedded in Host Bus Adapter (HBA). This embodiment attains a tight integration with host system and software, can scale linearly with addition of more HBAs (Host Bus Adapters), can be used with any type of storage network, and with any type of storage device, and data can be pushed from the HBA out to storage devices.

In the embodiments presented in FIGS. 2, 7A-7B and 8, the DCE memory controller 40 is connected to the PCIe switch bus 36. This embodiment provides for tight integration with PCIe switch, and works with any type of PCIe storage device that can DMA (Direct Memory Access) the data.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A data storage system, comprising:
a Distributed Computer Engine (DCE) memory controller operatively coupled between at least one data generating entity and a data storage, and having at least one logic function Controller Block embedded therein, and
an external Memory Unit operatively coupled to said at least one Controller Block,
wherein said at least one Controller Block including:
a first Buffer,
a second Buffer,
a Compute Engine coupled, by inputs thereof, to outputs of said first and second Buffers and configured to perform a plurality of predetermined compute operations on data written at least in one of said first and second Buffers, and
an Address Decode and Control Unit residing at said at least one Controller Block in operational connection with said Compute Engine and said external Memory Unit;
wherein said DCE memory controller is configured to receive a request from said at least one data generating entity, said request including an address request associated therewith, wherein said address request is composed of a Physical Address field corresponding to an address of a data block in said external Memory Unit, and a Control bits field embedded in said address request and identifying at least one of said plurality of predetermined compute operations, wherein said Address Decode and Control Unit is configured, upon receipt of said address request, to decode information contained in said Control bits field of said address request and prompt said Compute Engine to perform said at least one predetermined compute operation.

2. The data storage system of claim 1, wherein said Address Decode and Control Unit is further configured to decode an information contained in said Physical Address field and to reach said data block at said corresponding data address in said external Memory Unit.

3. The data storage system of claim 2, wherein said request is a "write" request containing an incoming data, and wherein said DCE memory controller is configured, upon receipt of said "write" request, to read said data block at said corresponding data address in said external Memory Unit, pass said data block into said first Buffer, and place said incoming data into said second Buffer, and apply, in said Compute Engine, said requested at least one predetermined compute operation to said incoming data and said data block, thereby obtaining a computational result.

4. The data storage system of claim 3, wherein said DCE memory controller is further configured to pass said computational result from said Compute Engine to said corresponding data address in said external Memory Unit.

5. The method of claim 4, wherein the computational result from said Compute Engine is a type of logic function of interest including at least one from XOR, NOR, OR, AND, NAND, ADD, SUBTRACT, MULTIPLY, DIVIDE, Bit shift, Byte swap, etc., and combinations thereof.

6. The data storage system of claim 2, wherein said request is a "read" request, and wherein said DCE memory controller is configured, upon receipt of said "read" request, to read said data block from said corresponding data address in said external Memory Unit, and pass said data block into said first Buffer, apply, in said Compute Engine, said requested at least one compute operation to said data block written in said first Buffer, thereby obtaining a computational result, and pass said computational result towards said data requesting entity.

7. The method of claim 6, wherein the computational result from said Compute Engine is a type of logic function of interest including at least one from XOR, NOR, OR, AND, NAND, ADD, SUBTRACT, MULTIPLY, DIVIDE, Bit shift, Byte swap, etc., and combinations thereof.

8. A data storage system, comprising:

a Distributed Computer Engine (DCE) memory controller operatively coupled between at least one data generating entity and a data storage, and having at least one logic function Controller Block embedded therein, and an external Memory Unit operatively coupled to said at least one Controller Block, wherein said at least one Controller Block including:
a first Buffer,
a second Buffer,
a Compute Engine coupled, by inputs thereof, to outputs of said first and second Buffers and configured to perform a plurality of predetermined compute operations on data written at least in one of said first and second Buffers, and an Address Decode and Control Unit residing at said at least one Controller Block in operational connection with said Compute Engine and said external Memory Unit;

wherein said DCE memory controller is configured to receive a request from said at least one data generating entity, said request including an address request associated therewith, wherein said address request is composed of a Physical Address field corresponding to an address of a data block in said external Memory Unit, and a Control bits field identifying at least one of said plurality of predetermined compute operations, wherein said Address Decode and Control Unit is configured, upon receipt of said address request, to decode information contained in said Control bits field of said address request and prompt said Compute Engine to perform said at least one predetermined compute operation, and to decode an information contained in said Physical Address field and to reach said data block at said corresponding data address in said external Memory Unit, and at least one PCIe switch coupled between said at least one data generating entity and said data storage, and configured to transmit said request to said DCE memory controller, and a PCIe Interface Unit operatively coupled between said at least one PCIe switch and said at least one Controller Block.

9. The data storage system of claim 8, further including a Memory Interface operatively coupled between said at least one Controller Block and said external Memory Unit, wherein said Memory Interface is configured to read said data block from said external Memory Unit to said first Buffer under control of said Address Decode and Control Unit, and to transmit said computational result to said corresponding data address in said external Memory Unit.

10. The data storage system of claim 2, further comprising a Virtual Memory, wherein said Address Decode and Control Unit is configured to perform memory mapping therebetween in correspondence with a type of said at least one compute operation.

11. The data storage system of claim 3, wherein said DCE memory controller includes a plurality of Controller Blocks, each configured to read said data block from said external Memory Unit to said first Buffer of said at least one of said plurality of Controller Blocks, while receiving said incoming "write" data from said at least one data generating entity at said second Buffer of at least another of said plurality of Control Blocks; and a first Multiplexer coupled between said plurality of Controller Blocks and said external Memory Unit, and configured to transmit said computational result to said external Memory Unit through said first Multiplexer in a coordinated fashion.

12. The data storage system of claim 11, wherein said DCE memory controller further includes a second Multiplexer coupled between outputs of said first Multiplexer and said external Memory Unit and said data storage.

13. The data storage system of claim 12, further including:
an ECC (Error Checking and Correction Code) generator unit operatively coupled between said first Multiplexer and said external Memory Unit for protecting said computational result transferred to said external Memory Unit from errors by applying said ECC procedure thereto, and an ECC (Error Checking and Correction) checking unit operatively coupled between said external Memory Unit and said data storage for protecting said results of the requested compute operation transferred from said external Memory Unit to said data storage from errors by applying said ECC procedure thereto.

14. The data storage system of claim 8, wherein said data storage includes a storage array coupled to said PCIe switch, where said storage array includes storage devices selected from a group consisting of: disk drives, solid-state memory devices, and combination thereof, and wherein said DCE memory controller is integrated with each of storage devices in said storage array.

15. The data storage system of claim 1, wherein said DCE memory controller is integrated with said at least one host for pushing data from a Host Bus Adapter thereof.

16. A data storage system, comprising:
a Distributed Compute Engine (DCE) memory controller, said DCE memory controller including:
at least one Logic Function Unit embedded therein,
wherein said at least one Logic Function Unit includes:
a first Buffer,
a second Buffer, and
a Logic Function Engine coupled, by inputs thereof, to outputs of said first and second Buffers residing at said at least one logic function unit, wherein said Logic Function Engine is configured to perform at least one compute operation;
a Memory Unit operatively coupled to said at least one Logic Function Unit,
wherein said DCE memory controller is configured, upon receipt of a "write" request from at least one data generating entity, to:
(a) transmit a data block from a physical address range at said Memory Unit into said first Buffer, wherein said physical address range is identified in said "write" request;
(b) place an incoming data received with said "write" request into said second Buffer;
(c) decode control information embedded in said "write" request and identifying said at least one desired compute operation;
(d) apply said Logic Function Engine to said data block and said incoming data; written in said first and second Buffers, respectively, to perform said at least one desired compute operation, thereby generating a computational result; and
(e) place said computational result into said physical address range in said Memory Unit.

17. A method for data migrating in a data storage system, comprising the steps of:
(a) embedding at least one Logic Function Unit into a Memory Controller, wherein said at least one Logic Function Unit includes a first Buffer, a second Buffer, and a Compute Engine coupled to said first and second Buffers;
(b) configuring said Compute Engine to perform at least one of a plurality of logic functions;
(c) coupling said Memory Controller between at least one data generating entity and an external Memory Unit;
(d) receiving a request from said at least one data generating entity, said request having a requested address associated therewith, wherein said requested address includes a Physical Address field, containing identification of a corresponding address of a data block in said external Memory Unit, and a Control bits field embedded in said request from said at least one data generating entity and containing information identifying at least one logic function of interest;
(e) decoding said requested address;
(f) placing, under control of said Memory Controller, said data block retrieved from said corresponding address at said external Memory Unit into said first Buffer; and
(g) applying, under control of said Memory Controller, said at least one logic function of interest identified in said Control bits field of said requested address to said data block written in said first Buffer, thereby generating a computational result.

18. The method of claim 17, further comprising the steps of:
before said step (g), placing, under control of said memory controller, an incoming data received with said request from said at least one data generating entity into said second Buffer, and
in said step (g), applying said at least one logic function to said data block written in said first Buffer and said incoming data written in said second Buffer.

19. The method of claim 17, further comprising the step of:
after said step (g), placing under control of said Memory Controller, said computational result at said address in said external Memory Unit identified in said Physical Address field of said requested address.

20. The method of claim 17, further comprising the steps of:
coupling a data storage to said memory controller, and
after said step (g), transmitting said computational result to said data storage.

21. The method of claim 17, further comprising the steps of:
mapping logical memory address to respective physical addresses in said external Memory Unit, and
performing the step of memory address mapping in accordance with a type of said at least one logic function of interest, said type of logic function of interest including at least one from Read/Write, Read/XOR Write, Read/OR Write, Read/AND Write, Read/NOR write, Read/NAND write, Read/ADD write, and Read/Subtract write.

22. The method of claim 19, further comprising the steps of:
coupling a PCIe switch between said at least one data generating entity and said Memory Controller;
coupling a storage array to said PCIe switch; and
upon receiving a "write" data request at said PCIe switch, performing the operations of:
transmitting said "write" data to said storage array and mirroring the same to said Memory Controller,
calculating a parity data for said "write" request by applying a XOR computational operation to said incoming data,
writing said parity data to said external Memory Unit at said corresponding address, and
sending a request to said storage array to read said parity data from said external Memory Unit.

23. The method of claim 18, wherein said Memory Controller includes a plurality of said Logic Function Units, further comprising the steps of:
simultaneously reading said data block from said external Memory Unit to said first Buffer of said at least one of said plurality of Logic Function Units, and writing said incoming data from said at least one data generating entity to said second Buffer of at least another of said plurality of Logic Function Units.

24. A method for data migrating in a data storage system, comprising:

(a) embedding a plurality of Logic Function Units into a Memory Controller, wherein each of Logic Function Units includes a first Buffer, a second Buffer, and a Compute Engine coupled to said first and second Buffers;

(b) configuring said Compute Engine to perform at least one of a plurality of logic functions;

(c) coupling said Memory Controller between at least one data generating entity and an external Memory Unit;

(d) receiving a request from said at least one data generating entity, said request having a requested address associated therewith, wherein said requested address includes a Physical Address field, containing identification of a corresponding address of a data block in said external Memory Unit, and a Control bits field containing information identifying at least one logic function of interest;

(e) decoding said requested address;

(f) placing, under control of said Memory Controller, said data block received from said corresponding address at said external Memory Unit into said first Buffer, and an incoming data received with said request from said at least one data generating entity into said second Buffer;

(g) applying, under control of said Memory Controller, said at least one logic function of interest identified in said Control bits field of said requested address to said data block written in said first Buffer and said incoming data written in said second Buffer, thereby generating a computational result, simultaneously reading said data block from said external Memory Unit to said first Buffer of said at least one of said plurality of Logic Function Units, and writing said incoming data from said at least one data generating entity to said second Buffer of at least another of said plurality of Logic Function Units;

coupling a Multiplexer between said plurality of Logic Function Units and said external Memory Unit, and transmitting said computational result to said external Memory Unit through said Multiplexer in a coordinated fashion.

25. The method of claim 24, further comprising the steps of:

coupling an ECC (Error Checking and Correction Code) generator unit between said Multiplexer and said Memory Unit, and protecting said computational result transferred to said external Memory Unit from errors by applying said ECC procedure thereto; and coupling an ECC (Error Checking and Correction) checker unit at the output of said external Memory Unit, and protecting said data transferred from said external Memory Unit from errors by applying said ECC procedure thereto.

* * * * *